United States Patent Office 3,413,341
Patented Nov. 26, 1968

3,413,341
HYDROLYSIS OF HALOAROMATICS
Kenneth F. Bursack, Herbert J. Moltzan, and Earnest L. Johnston, Wichita, Kans., assignors to Frontier Chemical Company, Division of Vulcan Materials Company, Wichita, Kans., a corporation of New Jersey
No Drawing. Continuation-in-part of application Ser. No. 374,144, June 10, 1964. This application July 19, 1965, Ser. No. 473,203
12 Claims. (Cl. 260—521)

ABSTRACT OF THE DISCLOSURE

Hydroxy-substituted aromatic compounds are made by hydrolysis of the corresponding halogenated compound in an aqueous medium in the presence of a hydrolyzing agent such as sodium acetate and a catalyst such as copper oxide at a temperature between about 200° and 350° C. and a pressure sufficient to maintain the reactants essentially in liquid phase. Initially adjusting the acidity of the mixture to a pH below 7 causes a desirable increase in the reaction rate.

---

This is a continuation-in-part of application Ser. No. 374,144, filed June 10, 1964, now abandoned.

This invention relates to a method for hydrolyzing mono-, di-, and poly-halogenated aromatic compounds. More particularly, it relates to a process for hydrolyzing such halogenated compounds in the presence of a salt of an organic acid under acid conditions. Suitable salts are those of the alkali metals, alkaline earth metals and metals capable of forming amphoteric compounds. The reaction is carried out in the presence of a catalyst, preferably copper or a copper compound, at a pH not greater than about 7, and preferably below 7.

It has heretofore been proposed to employ alkali metal hydroxides or the salt of strong bases and weak inorganic acids to hydrolyze certain chlorinated aromatic hydrocarbons such as chlorobenzene under alkaline conditions to produce hydroxy aromatic compounds such as phenol. The specific salts suggested for use in such processes are the carbonates, borates, phosphates and silicates of the alkali metals or of the alkaline earth metals. Copper has been suggested as a catalyst for this reaction. The temperatures employed are generally above about 300° C., although the art contains suggestions that temperatures of 250-375° C. may be used. However, these old processes require both the use of a relatively high proportion (at least two molar equivalents) of caustic alkali or alkali metal to effect the desired replacement of halogen with hydroxyl, and the use of a relatively high proportion of strong mineral acid to "spring" the free phenolic compound from the phenate formed. This results in waste of large amounts of valuable materials. The present invention requires only about one molecular equivalent of caustic alkali for each hydroxyl group introduced as replacement for a halogen atom and generally requires no acid for neutralization.

While certain salts of strong bases and weak inorganic acids, e.g., the borates, carbonates, bicarbonates, phosphates, etc., have been previously proposed to hydrolyze chloroaromatics (see U.S. 1,882,824; 1,882,826 and 1,925,321) such reaction in general has been found to be limited to monochloroaromatic hydrocarbons to produce phenol, and even then low product yields are obtained due to the high reaction temperatures required and the side reactions ensuing therefrom. Particularly with polychlorinated aromatic hydrocarbons or chlorinated phenols, little conversion to the desired polyhydroxy aromatics occurs and the reaction is usually accompanied by formation of tars and other degradation products, as well as the formation of unwanted isomers. The formation of hydroxy benzoic acids represents another disadvantage when chlorobenzenes are hydrolyzed in the presence of carbonates or bicarbonates.

We have discovered that ring-halogenated aromatic compounds such as mono-, di- and other poly-halogenated aromatic hydrocarbons, including those of the benzene series as well as fused ring hydrocarbons such as the naphthalenes and anthracenes, and also the corresponding halogenated phenols, halogenated aromatic ethers, halogenated aromatic acids, halogenated nitrobenzenes, halogenated anilines, and all the various lower alkyl and alkoxy derivatives thereof, may be hydrolyzed to replace the halogens with hydroxy groups and thereby to produce high yields of the corresponding hydroxy compounds. with little or no degradation and at temperatures which are, in general, substantially below those which the prior art has taught to be preferred. For economic reasons the chloro-compounds are preferred starting materials, but compounds containing bromine, iodine or fluorine atoms as ring substituents, as well as mixed halogen derivatives, e.g., ring substituted chloro-, bromo-, chloro-fluoro-, iodo-bromo-compounds, etc., are likewise useful.

More specifically, the invention can be applied to mono- and polycyclic compounds containing a substituted aromatic group

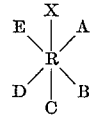

wherein R is a benzene, naphthalene or anthracene nucleus, X is a halogen, and A, B, C, D and E are the same or different members of the class consisting of halogens, alkyl groups of 1 to 3 or more carbon atoms, hydroxyl, phenyl carboxyl, alkoxy groups of 1 to 3 or more carbon atoms, phenoxy groups, and any other substituent that does not interfere with the reaction. Accordingly, representative compounds useful herein include: chlorobenzene, the dichlorobenzenes and the trichlorobenzenes; the several ring-substituted chloro- and dichlorotoluenes; the several ring substituted chloro- and dichloroxylenes; chloromesitylene, chlorodurene, dichlorodurene, etc.; chlorocumene, dichlorocumene, di-tertiary-butyl chlorobenzene, etc.; chlorophenol, dichlorophenol, chlorocresol, chlorobenzoic acid, chlorophthalic acid, 3,6 - dichlorophthalic acid, 2,4 - dichlorophenoxyacetic acid, etc.; chloroanisole, chlorophenetole, chlorodiphenyl oxide, bis-chlorophenyl oxide, phenyl dichlorophenyl oxide; bis-chlorophenyl ketone, chlorobenzaaldehyde, di(parachlorophenyl) methyl carbinol; chlorodiphenyl, bis - methylchlorophenyl, chloronaphthalenes, methylchloronaphthalenes, chloroethoxynaphthalenes, chlorobenzanthrone, etc.; as well as the bromo, iodo and fluoro compounds corresponding to such chloro compounds.

The temperatures used in the present process are in general from 200° to 350° C. and preferably from about 225° to about 275° C. The reaction is carried out in an aqueous system at a pH below about 7 and preferably between about 3 to about 6. The pressure employed is usually the autogenous pressure of the reactants in the system, the reaction being carried out in a sealed autoclave, a tubular type reactor or other type of reactor capable of withstanding the pressure developed in the system and having suitable agitation. Furthermore, the reaction can be conducted either continuously or in a batchwise manner and under superimposed pressure of nitrogen or other gas which does not interfere with the reaction.

The reaction time, which may include an initial induction period, is generally from about two to about four hours. However, substantially shorter reaction times, e.g., 1 to 2 hours are often sufficient when the induction period is minimized or eliminated by proper pH adjustment of the initial reaction mixture, and longer reaction times of up to 20 hours or more may be used in other instances. The time for carrying out the reaction depends somewhat on the specific reactant being converted as well as on the reaction temperature, and should be sufficient to carry it to the desired degree of completion. It should not, however, be prolonged substantially beyond this point both for economic reasons and in order to prevent possible degradation of the reaction products, particularly when temperatures near the higher end of the scale are employed. At the higher temperatures the required reaction time is reduced.

When a metal salt such as sodium acetate is used, the initial pH of the aqueous layer is about 8, or slightly on the basic side, at which the reaction proceeds very slowly. This results in an induction period, varying with the temperature, of about 0.5 to 1.5 hours during which little reaction occurs. However, as soon as sufficient acid is liberated to bring the pH to the acid side, e.g., below 6, the reaction rate increases rapidly.

It is thus preferred that the reaction system at the beginning of the reaction be adjusted to a pH below 7. This can be done by addition of a suitable free organic acid, generally the acid corresponding to that of the salt employed. As the hydrolysis proceeds, the metal atom of the salt, e.g., sodium acetate, combines with the chlorine or other halide atom of the halogenated aromatic compound and liberates free acid, e.g., acetic acid. The pH can be maintained within the preferred range of about 3 to about 6 by addition, continuously or intermittently, of a small amount of an alkali metal hydroxide or other suitable base, although this is not always necessary. The conduct of the present process it an acid pH, such that the copper catalyst is in solution, is contrary to prior teachings that reaction mixtures such as those used herein should be kept basic. It has, in fact, been stated, in the past, that the reaction mixture must be kept basic in order to precipitate all copper ions as coper oxide.

The catalyst employed is copper metal or an oxide or salt of copper such as the chlorides, acetates, sulfate, phosphate, etc. It is preferred that a substantial amount of the copper catalyst should be in solution. Maintaining the pH somewhat below the neutral point assists in this. Some other metal salts such as those of cobalt and silver also promote hydrolysis, but these are less effective than copper and its salts. The relative efficiency of the various catalysts was determined in glass tubes to prevent any possible coatings or other metal ion hydrolysis.

The preferred hydrolyzing agents comprise the acetates of sodium, potassium, calcium, magnesium, or other alkali or alkaline earth metal. Acetates of elements such as aluminum which form amphoteric compounds are effective, although to a somewhat lesser degree than those of the other metals mentioned. The corresponding metal salts of other low molecular weight alkanoic acids having up to about 4 carbon atoms per molecule may also be used with excellent results, including the propionates, butyrates, succinates, etc. The corresponding salts of higher acids, e.g., those having up to 12 or more carbon atoms per molecule, such as hexanoic and lauric acid, are also usable but substantially less effective. It appears that the hydrolysis will proceed with the water soluble salt of any stable organic acid and an inorganic cation which will readily form a salt with the liberated halogen. From the standpoint of cost and of effectiveness, sodium acetate or sodium propionate is preferred. However, since it is possible to effect nearly quantitative recovery of the organic acid for recycle, the additional acid cost is only incurred initially and is thereafter only a minor factor. Acetates of other metal bases have also been tested. In almost all cases some hydrolysis has occurred, though the extent was relatively small when an acetate of a heavy metal, e.g., chromium acetate, was used in the treatment of relatively difficulty hydrolyzable compounds, e.g., chlorophenol. As a general proposition it appears, however, that the hydrolysis will proceed with the salt of any stable organic acid and an inorganic action that is at least partially soluble in the reaction medium under the reaction conditions, including pH, that are used and that will readily form a salt with the chloride that is liberated.

The proportion of the hydrolyzing agent may be varied depending upon the compound being hydrolyzed. For example, with monochlorobenzene to produce phenol, stoichiometric proportions may be used, inasmuch as one sodium ion is consumed for every chloride ion present. For the hydrolysis of dichlorobenzene to produce chlorophenol, about one sodium ion per chloride ion to be removed may be employed. To completely hydrolyze dichlorobenzene to the corresponding dihydroxybenzene (e.g., hydroquinone, resorcinol, etc.) one molar equivalent of sodium acetate or other hydrolyzing agent is required for each hydroxyl group to be introduced as replacement for chlorine of the dichlorobenzene starting material. Any unreacted chlorohydrocarbon and any diphenyl compounds can be recycled to the reaction zone, as may be the liberated acetic (or other) acid. The use of a mutual solvent, such as methanol, ethanol, phenol, etc., or of any convenient surfactant, to improve the contact between the organic and aqueous phases, is also contemplated. The Addition or recycle of some of the desired hydroxylated aromatic compound to the initial reaction mixture can be similarly beneficial in improving contact between the phases.

One specific method of carrying out the process is to charge the desired halogenated hydrocarbon to an autoclave capable of withstanding the reaction pressure. Acetic acid or other lower alkanoic acid may be added, preferably somewhat more than one molar equivalent, e.g., at least 1.05 equivalent and preferably about 1.3 to about 1.8 equivalents for each halogen atom to be replaced. Also added are 5 to 80, preferably 10 to 40, molar equivalents of water per each halogen atom to be replaced. The copper catalyst is added in proportions of 0.01–0.2 atom of copper per atom of halogen to be replaced. Sufficient alkali hydroxide (e.g., NaOH, KOH, Ca(OH)$_2$, Al(OH)$_3$, etc.) is added to obtain the desired pH of 3 to 7, preferably less than 6. The autoclave is then closed and heated to the desired reaction temperature, preferably 225° C., and stirred to keep the contents uniform. At the end of the reaction period, say one to four hours, the autoclave is cooled, and the contents treated by conventional methods to recover the end product. Any unreacted chlorinated hydrocarbon is recovered and may be recycled along with the recovered acetic acid.

Instead of forming the sodium acetate or similar salt in situ by separate addition of acid and base to the charge, one can of course add the salt directly, and then adjust the pH to the preferred value by supplemental addition of free acid or free base, as the case may require.

The following examples are given to illustrate typical reactions which may be carried out employing our invention, but are not intended to unduly limit the scope thereof:

Example I

A 300 ml. copper-coated agitated autoclave was charged with 0.3 mole of sodium acetate, 0.2 mole of chlorobenzene, 1.0 gram of cuprous oxide and 125 ml. of water. This was heated to 265° C. with agitation for eight hours. At the end of this time the autoclave was cooled and the contents washed into a beaker with water. Two layers were present. The organics were extracted with ether, the extracts combined and the ether evaporated. The dark oil remaining weighed 22.7 g. This oil was primarily made up of chlorobenzene (18 parts), phenol (74 parts) and diphenyl oxide (8 parts). The unreacted chlorobenzene and the diphenyl oxide can be added to the next batch. The phenol was recovered as a product.

Example II

A 1 liter copper-coated autoclave was charged with 0.8 mole of the desired chlorotoluene, 1.2 moles of sodium hydroxide, 1.29 moles of propionic acid, 4 grams of cuprous oxide and 500 ml. of water. This was heated with agitation to 275° C. and the reaction conducted at this temperature for about seven hours. At various intervals during this time, samples were withdrawn from the autoclave and analyzed. At the end of this time, the reactor was cooled and the contents extracted with ether. Evaporation of the ether yielded an oil rich in cresol. Analysis of the final oils obtained when the various chlorotoluenes were used gave the following data:

| Material | Percent Conversion | Percent Yield |
|---|---|---|
| o-Chlorotoluene | 77.5 | 89.3 |
| p-Chlorotoluene | 71.6 | 88.1 |
| m-Chlorotoluene | 74.6 | 86.5 |
| Mixture of o- and p-Chlorotoluene | 71.1 | 89.9 |

Analysis of the oils withdrawn during the reaction showed that the reaction was essentially complete after one hour and that the percent yield would be improved if the reaction were stopped at this point. For example, m-cresol was obtained in 96.5 percent yield at a conversion of 65 percent after a one hour reaction time. In each instance, no isomerization was detected.

Example III

A copper-coated autoclave was charged with 0.1 mole (12.9 g.) of p-chlorophenol, 0.3 mole (40.8 g.) of hydrated sodium acetate, 1 g. cuprous oxide and 125 ml. of water. The autoclave was sealed and the contents heated with agitation to 200° C. After about ten hours the reactor was cooled and the contents removed. As in the previous examples, no acidification was necessary. The reaction mixture was then extracted with ether. The extracts were combined and the ether evaporated to yield a liquid containing 18.8% hydroquinone, 79.9% p-chlorophenol and 1.3% phenol. No resorcinol was detected in the product.

Example IV

A series of three runs were made to determine the effect of adding sodium hydroxide along with sodium acetate. The runs were conducted as follows:

The desired amount of sodium acetate and sodium hydroxide were charged into a 300 ml. copper-coated autoclave along with 0.1 mole of p-chlorophenol, 1 g. of cuprous oxide and the desired amount of water. The reactor was sealed and the contents heated with agitation to 200° C. After eleven hours the reactor was cooled, the contents acidified and then extracted with ether. The ether was then evaporated leaving a liquid having the composition listed in the following table.

| Charged | | | Recovered | | |
|---|---|---|---|---|---|
| Moles p-Chlorophenol | Moles Sodium Acetate | Moles Sodium Hydroxide | Percent Phenol | Percent Chlorophenol | Percent Hydroquinone |
| 0.1 | 0.05 | 0.2 | 3.0 | 95.7 | 1.3 |
| 0.1 | 0.2 | 0.1 | 12.1 | 87.2 | 0.7 |
| 0.1 | 0.2 | 0.05 | 2.6 | 96.2 | 1.2 |

By comparing these results with the results of Example III it can be seen that the high hydroxyl ion concentration resulting from the presence of the free sodium hydroxide in the mixture has an adverse effect on the desired reaction.

Example V

A series of runs were made to determine the effects of copper and various copper salts as catalysts for the hydrolysis using sodium acetate. The following procedure was used:

Glass tubes having an approximate volume of 19 ml. were charged with 0.02 mole of sodium acetate, 0.01 mole of m-chlorophenol, 6 ml. of water and an amount of catalyst equivalent to 0.2 gram of cuprous oxide. The tubes were immediately sealed and then heated, with rotation end over end, in an oven at 200° C. After twelve hours the tubes were cooled and opened. The contents were washed with water and then extracted with ether. The ether was then evaporated to obtain the reaction products. The results from these runs are shown below.

| Catalyst | Analysis | | |
|---|---|---|---|
| | Percent Chlorophenol | Percent Phenol | Percent Resorcinol |
| None | 100 | | |
| Cuprous oxide | 19.1 | 1.8 | 79.1 |
| Cupric chloride | 37.9 | 1.7 | 60.4 |
| Cuprous chloride | 11.3 | 3.0 | 85.7 |
| Cupric acetate | 0.5 | 7.0 | 92.5 |
| Copper metal | 37.1 | | 62.9 |
| Cupric sulfate | 15.6 | 3.4 | 81.0 |

No pyrocatechol or hydroquinone was detected in any run.

These data show that copper can be added in any of its various valence forms.

Example VI

Various other acetates have been tried as hydrolyzing agents for m-chlorophenol in order to determine the importance of the type of cation. These hydrolyses were again run in glass tubes as described in connection with Example V. The catalyst used was cuprous oxide (0.2 gm). The following results, which include a sample run using sodium hydroxide, were obtained:

| Hydrolyzing Agent | Percent Chlorophenol | Percent Phenol | Percent Resorcinol |
|---|---|---|---|
| Potassium acetate | 0.6 | 4.1 | 94.3 |
| Sodium acetate | 19.1 | 1.8 | 79.1 |
| Magnesium acetate | 15.5 | 0.7 | 83.8 |
| Calcium acetate | 38.9 | 1.1 | 60.1 |
| Aluminum acetate | 70.0 | 4.4 | 25.6 |
| Chromium acetate | 96.9 | 0.2 | 2.9 |
| Sodium hydroxide | 69.3 | | 30.7 |

The salts of the alkali metals, alkaline earth metals and magnesium give excellent results. Aluminum acetate, while having the advantage over sodium hydroxide that its use does not require any acidification to spring the resorcinol, actually gives somewhat less of the desired product than the sodium hydroxide. Salts of heavy metals such as chromium are substantially ineffective.

Example VII

The hydrolysis of m-chlorophenol using the sodium salts of several other organic acids was investigated. These hydrolyses were conducted in glass tubes as described earlier in connection with Example V. The following results were obtained:

| Hydrolyzing Agent | Percent Chlorophenol | Percent Phenol | Percent Resorcinol |
|---|---|---|---|
| Sodium acetate | 19.1 | 1.8 | 79.1 |
| Sodium succinate | 1.9 | 3.9 | 94.2 |
| Sodium propionate | 4.8 | 4.2 | 91.0 |

Example VIII

The sodium salts of lauric acid and hexanoic acid were investigated using a 300 ml. copper-coated autoclave. The charge consisted of 0.2 mole of the sodium salt of the desired acid, 0.1 mole m-dichlorobenzene, 125 ml. of water and 0.5 g. cuprous oxide. The reactor was then sealed and heated with agitation to 275° C. After five hours the reactor was cooled and the contents removed. The reaction mixture was then extracted with ether which, on evaporation, yielded an oil having the following composition:

| Hydrolyzing Agent | Percent m-Dichlorobenzene | Percent Chlorophenol | Percent Resorcinol |
|---|---|---|---|
| Sodium laurate | 38.0 | 43.1 | 18.9 |
| Sodium hexanoate | 38.4 | 14.2 | 47.2 |

It can be seen that substantial hydrolysis has taken place in either case but that the laurate favored formation of the monohydroxy derivative whereas the hexanoate favored formation of the dihydroxy derivative.

Example IX

A series of runs were made in which 0.1 mole of m-dichlorobenzene was hydrolyzed using 1 g. of cuprous oxide or cuprous chloride as catalyst, 125 ml. of water as the solvent and the desired amount and type of hydrolyzing agent. The reactions were conducted in a copper-coated autoclave at the indicated temperature and time. When the desired time had elapsed, the reactor was cooled and the contents were extracted with ether. When sodium hydroxide was used as the hydrolyzing agent, it was necessary to acidify before extracting. The ether was then evaporated yielding a liquid having the composition stated in the table below.

| Hydrolyzing Agent | NaOH | NaOCOCH$_3$ | NaOCOCH$_3$ | NaOCOCH$_3$ | NaOCOCH$_3$ |
|---|---|---|---|---|---|
| Amount, moles | 0.4 | 0.3 | 0.3 | 0.18 | 0.2 |
| Temperature | 250 | 230 | 250 | 250 | 300 |
| Time, hours | 6.5 | 10 | 10 | 10 | 6 |
| Percent m-Dichlorobenzene | 1.0 | 18.1 | 2.5 | 31.7 | 9.3 |
| Percent Phenol | 64.1 | 6.0 | 7.3 | 3.3 | 7.3 |
| Percent m-Chlorophenol | 18.1 | 7.3 | 2.8 | 1.7 | 1.5 |
| Percent Resorcinol | 13.8 | 68.6 | 87.2 | 63.4 | 81.5 |

No pyrocatechol or hydroquinone was detected.

Example X

A few runs were made to determine the effect of pH on the rate of reaction. These runs were conducted in a 1 liter copper-coated autoclave using the following charge: m-dichlorobenzene, 0.8 mole; propionic acid, 1.76 mole; cuprous oxide, 4.0 g.; sodium hydroxide, 1.76 mole; water, 400 ml. An additional amount of sodium hydroxide or propionic acid was added as required to adjust the pH to the desired level. The reactions were performed at 250° C. for several hours. Samples of the reaction mixture were taken at various intervals and these samples were immediately checked for pH and then extracted with ether to remove all of the organics. The ether was then evaporated and the products analyzed. The following data was obtained from runs starting at two different pH levels.

(a) Hldrolysis of m-Dichlorobenzene starting at a pH of 10

| Time, Minutes | pH | Percent Unreacted m-Dichlorobenzene |
|---|---|---|
| [1] 0 | 10 | 98.8 |
| 60 | 9 | 94.9 |
| 180 | 7 | 81.5 |
| 313 | 6 | 68.7 |
| 433 | 6 | 55.7 |

[1] Taken when the reaction temperature reached 250° C.

(b) Hydrolysis of m-Dichlorobenzene starting at a pH of 6

| Time, Minutes | pH | Percent Unreacted m-Dichlorobenzene |
|---|---|---|
| [1] 0 | 6 | [2] 79 |
| 60 | 6 | 55 |
| 189 | 5 | 42 |

[1] Taken when the reaction mixture reached 250° C.
[2] Some reaction had already occurred during the heat-up period which did not occur when the pH was on the basic side.

Example XI

Several other runs have been made to determine when the reaction is finished. These runs were conducted in a 1 liter autoclave using the following charge: m-dichlorobenzene, 0.4 mole; sodium acetate, 1.2 moles; cuprous oxide, 4 g.; and water, 500 ml. The reactions were conducted as described earlier at the desired temperature with samples of the reaction being taken at various intervals. The pH of each of these samples was determined and each sample then immediately extracted with ether to remove all the organics. The ether was then evaporated and the resulting oils analyzed. The data from runs at two different temperatures are shown in the following tables.

(a) Hydrolysis of m-Dichlorobenzene at 250° C.

| Time, Minutes | pH | Percent m-Dichlorobenzene [1] | Percent Phenol | Percent m-Chlorophenol | Percent Resorcinol |
|---|---|---|---|---|---|
| [2] 0 | 6.3 | 98.4 | [3] | 1.6 | |
| 130 | 5.0 | 18.1 | [2] | 38.0 | 43.8 |
| 260 | 4.5 | 1.5 | 2.9 | 18.3 | 77.2 |
| 370 | 4.5 | 2.4 | 3.4 | 12.9 | 81.2 |
| 480 | 4.3 | 1.5 | 2.9 | 9.5 | 86.0 |

[1] A small amount was lost on sampling.
[2] Taken when the reaction mixtures reached 250° C.
[3] Undetermined.

(b) Hydrolysis of m-Dichlorobenzene at 290° C.

| Time, Minutes | pH | Percent m-Dichlorobenzene [1] | Percent Phenol | Percent m-Chlorophenol | Percent Resorcinol |
|---|---|---|---|---|---|
| [2] 0 | 4.5 | 23.4 | [3] | 37.5 | 39.2 |
| 45 | 4.5 | 2.0 | 2.8 | 12.2 | 83.0 |
| 90 | 4.5 | 0.8 | 2.8 | 8.3 | 88.2 |
| 150 | 4.5 | 0.3 | 2.9 | 5.7 | 91.0 |
| 210 | 4.5 | 0.3 | 3.2 | 3.3 | 93.4 |

[1] A small amount was lost on sampling.
[2] Taken at the time when the reaction mixture reached 290° C.
[3] Undetermined.

No pyrocatechol or hydroquinone was detected in these reactions either at 250° C. or at 290° C.

Example XII

A copper-coated 1 liter autoclave was charged with 89.9 g. (0.8 mole) of chlorobenzene, 109 g. (0.8 mole) of hydrated sodium acetate, 4 g. of cuprous oxide and 500 ml. of water. The autoclave was sealed and then heated with agitation to 270° C. The reaction was then conducted at this temperature for several hours. During this time the reaction mixture was sampled at various intervals. After this the reactor was cooled and the contents poured into a separatory funnel. Two layers were present and were separated. The aqueous layer was then extracted with ether. The extracts were combined and the ether removed yielding an organic liquid. Analysis of the sample revealed the following:

Hydrolysis of Chlorobenzene

| Time, Minutes | Percent Chlorobenzene | Percent Phenol | Percent Diphenyl Oxide |
|---|---|---|---|
| [1] 0 | 94.1 | 5.9 | |
| 60 | 51.9 | 47.0 | 1.2 |
| 160 | 24.6 | 69.4 | 6.0 |
| 295 | 17.8 | 73.9 | 8.3 |
| 430 | 18.3 | 72.9 | 8.8 |

[1] Taken when the reaction mixture reached 270° C.

Example XIII

A copper-coated autoclave was charged with 14.7 g. (0.1 mole) of m-dichlorobenzene, 27.2 g. (0.2 mole) of hydrated sodium acetate, 1 g. cuprous oxide and 125 ml. of water. The autoclave was sealed and then heated with agitation to 325° C. This temperature was maintained for about two hours and then the reactor was cooled and vented. The reaction mixture was then extracted with ether, which, on evaporation, yielded a product weighing 10.4 g. This product was composed of 3.4% m-dichlorobenzene, 2.7% phenol, 8.4% m-chlorophenol and 85.5% resorcinol.

A similar run conducted at 345° C. for 45 minutes yielded a product composed of 49% resorcinol, 42.4% m-dichlorobenzene, 6.8% m-chlorophenol and about 1% phenol.

These runs did not show any pyrocatechol or hydroquinone.

Example XIV

A copper-coated autoclave was charged with 0.1 mole of p-dichlorobenzene, 125 ml. of water, the desired amount and type of base and 1 g. cuprous oxide or cuprous chloride. The autoclave was sealed and the reaction conducted at 250° C. for eleven hours. At the end of this time the reactor was cooled and the organic products recovered by ether extraction. When sodium hydroxide, sodium borate or sodium carbonate was used as the base, it was necessary to acidify the reaction mixture before the ether extraction. The results of these runs are shown in the following table.

| Hydrolyzing Agent | Sodium Hydroxide | Sodium Acetate | Sodium Borate | Sodium Carbonate |
| --- | --- | --- | --- | --- |
| Amount, moles | 0.4 | 0.18 | 0.11 | 0.11 |
| Recovery of Organics, percent | 60 | 95 | 82 | 90 |
| Organic Composition: | | | | |
| Percent p-Dichlorobenzene | 45 | 59.9 | 72.2 | 95.3 |
| Percent p-Chlorophenol | 55 | 19.7 | 27.8 | 4.7 |
| Percent Hydroquinone | (¹) | 20.4 | (¹) | (¹) |

¹ None

This example not only shows the difference in effectiveness between strong bases and sodium acetate in the hydrolysis of p-dichlorobenzene to hydroquinone, but shows that overall recovery of organics is much greater in the case of the latter agent.

Example XV

A 1 liter copper-coated autoclave was charged with 0.8 mole p-chlorotoluene, 1.2 moles of sodium hydroxide, 1.31 moles of propionic acid, 4 grams of cuprous oxide, 500 ml. of water and 0.4 mole of p-cresol, the latter to improve contact between the phases. This was heated under autogenous pressure with agitation to 275° C. and the reaction conducted at this temperature for 7 hours. During this time, samples were withdrawn from the autoclave at various intervals and later analyzed.

The course of the reaction as shown by these samples is shown below:

| Time, Minute | Product Composition, Weight Percent | | |
| --- | --- | --- | --- |
| | p-Chlorotoluene | p-Cresol | High boiler |
| ¹0 | 24.0 | 75.5 | 0.4 |
| 30 | 26.3 | 72.2 | 1.7 |
| 60 | 22.0 | 75.0 | 3. |

¹ Sample taken when reaction mixture reached 270° C.

A similar run was made in which only 0.1 mole of p-cresol was included in the charge. The rest of the charge was the same and the reaction was conducted as described above. The following results were obtained.

| Time, Minutes | Product Composition, Weight Percent | | |
| --- | --- | --- | --- |
| | p-Chlorotoluene | p-Cresol | High boiler |
| ¹0 | 67.1 | 32.9 | |
| 15 | 58.5 | 40.4 | 1.1 |
| 30 | 56.3 | 42.7 | 0.8 |
| 60 | 55.0 | 42.3 | 2.5 |

¹ Sample taken when reaction mixture reached 270° C.

From the above two runs, it can be seen that the reaction proceeds more rapidly whent he greater proportion of cresol has been added.

Example XVI

A copper-coated 1 liter autoclave was charged with 0.4 mole of α-chloronaphthalene, 0.6 mole of sodium propionate, 1.13 mole of propionic acid, 500 ml. of water and 4 grams of cuprous oxide. This was heated with agitation to 275° C. The reaction was conducted at this temperature for 7 hours. The reactor was then cooled and the organics removed by extracting with ether. Evaporation of the ether showed that an 87 percent yield of α-naphthol had been obtained. The conversion was 64 percent.

A sample taken after the run had been conducted for one hour showed a conversion of 42 percent and a yield of 88 percent.

Example XVII

In a manner similar to Example XVI, 0.1 mole of β-chloronaphthalene was reacted at 250° C. with 0.15 mole of sodium propionate, 0.22 mole of propionic acid and 125 ml. of water using 1 gram of cuprous oxide as catalyst. The reaction was conducted for 6 hours. The reaction mix after cooling was extracted with ether. Evaporation of the ether yielded an oil which on analysis showed that β-naphthol had been obtained in a yield of 85 percent at 68 percent conversion.

Examples XVIII–XXII

The scope of the present invention is further illustrated by a series of runs made in glass tubes. These runs were made by charging the desired amounts of the reactants to the tubes and then rotating the sealed tubes, end over end, in an oven at a desired temperature between 250° and 275° C. for 6 to 8 hours. The data obtained in this manner are shown below:

| Example No. | Reactant | Conversion, Percent | Yield of Hydrolysis Products, Percent |
| --- | --- | --- | --- |
| XVIII | m-Dibromobenzene | 77 | 77 |
| XIX | Iodobenzene | 86 | 81 |
| XX | Bromobenzene | >95 | 75 |
| XXI | p-Chlorophenetole | 40 | 87 |
| XXII | M-Chlorobenzoic acid | 49 | 73 |

These results show that the present invention is applicable to the production of hydroxy compounds from a wide variety of halogenated aromatic compounds, irrespective of the particular halogen of the initial reactant and also irrespective of the presence of other substituents such as ether groups, carboxyl groups, etc.

Attempts were made to hydrolyze p-chlorophenol, using trisodium phosphate as the hydrolyzing agent and cupric sulfate as the catalyst. Proportions of reactants similar to those used in other examples were employed at temperatures of 195° C. and 250° C. and 4–5 hours reaction time. At the higher temperature the product was a tarry mass, the p-chlorophenol having been entirely degraded. No hydroquinone was detected. At 195° C. the product was a dark oil which was almost entirely composed of the starting material p-chlorophenol.

A similar test at 225° C. using barium hydroxide was carried out. More than 95% of the original p-chlorophenol appeared in the reaction product.

Sodium borate was used at a temperature of 230° C. and a time of 4.5 hours. The resultant oil contained about 3% of hydroquinone and about 90% unconverted p-chlorophenol, the remainder being phenol.

Similar results were obtained using sodium carbonate at temperatures of 200° C. and 250° C. About 2–3% of a hydroquinone was produced, the remainedr being unconverted p-chlorophenol and degradation products. In the case of sodium borate and sodium carbonate, no catalyst was added.

A test was carried out using disodium phosphate in the presence of finely divided copper metal at a temperature of 250° C. for 4 hours. The resultant product contained about 15% hydroquinone and 10% phenol, the remainder unreacted p-chlorophenol. A similar test carried out at 300° C. resulted in considerable carbonization of the reactants. The ether soluble organic portion contained about 23% hydroquinone and 26% phenol, the remainder being unreacted p-chlorophenol.

A run was made using sodium hydroxide in methanol for hydrolyzing p-chlorophenol. It was carried out at 225° C. in the presence of copper sulfate catalyst. After 4 hours, followed by acidification, a liquid containing 10% phenol and 2.6% hydroquinone was obtained. The remainder was unreacted p-chlorophenol.

The data show that the hydrolysis of mono- and polyhalogenated aromatic using a water soluble salt such as sodium acetate, sodium propionate and the like as the hydrolyzing agent is an effective and highly selective method for obtaining a variety of desired aromatic hydroxy compounds. With this new method the desired hydroxy aromatic can be obtained in high yields using milder reaction conditions and less hydrolytic agent than those previously described in the literature.

For instance, the hydrolysis of chlorobenzene is normally conducted at 325–400° C. according to the prior art. At these high temperatures a considerable amount of diphenyl oxide is formed (15%) which must be recycled. With sodium acetate the reaction can be conducted at a much lower temperature (265° C.) with a consequent lowering of the diphenyl oxide concentration by one-half.

With the dichlorobenzenes, especially ortho- and para-, the use of sodium hydroxide causes extensive decomposition and formation of isomers of the desired product. It has been suggested in the prior art that this can be partially eliminated by adding large amounts of barium or strontium hydroxides, but such addition has been found commercially impractical because of the high cost of these hydroxides. Attempts to eliminate such decomposition by reducing the reaction temperature have also been futile because no conversion to the dihydroxy compound and only a slow conversion to the corresponding chlorophenol is obtained at low temperatures. This is best illustrated by the teachings of U.S. Patent No. 2,126,648 that chlorophenol can be prepared from dichlorobenzene in the presence of sodium hydroxide when using methanol as a solvent. In this procedure the hydrolysis essentially stops after the first chlorine has been hydrolyzed. When the reaction temperature is increased in an effort to remove the second chlorine atom, considerable diphenyl oxide formation and decomposition occur. In contrast, when sodium acetate is used in accordance with the present invention, decomposition is held to a minimum and the corresponding dihydroxy compound is obtained in good yield.

In the foregoing examples of this invention, the recovery of organic material has been essentially quantitative. In most cases, therefore, the analysis given for the final product is a representation of the yield of the various materials contained therein. This, of course, gives a yield that is not corrected for unreacted material. Since the unreacted starting and incompletely reacted intermediate materials can be recycled, the percent yield of hydrolyzed products is generally found to be quite high, usually greater than 90–95%.

In contrast to the prior use of sodium hydroxide, carbonate, etc., the present examples show that the salts used as hydrolyzing agents in the present invention will effect the desired hydrolysis readily. Furthermore, when the hydrolysis is complete, no acidification is necessary and the products can be separated by suitable methods using solvent extraction, distillation, etc. The acetic or other organic acid liberated in the reaction as a by-product is also separated by known means and can be recycled so that little or no loss occurs. This then results in a stoichiometric usage of sodium hydroxide, the amount used being that necessary to reform sodium acetate from the recovered acetic acid.

Little reference is found in the prior art to the hydrolysis of chlorophenols to the corresponding polyhydoxy compounds. Indeed, when bases such as the alkali metal hydroxides, carbonates, bicarbonates, phosphates and borates are used at temperatures high enough to effect hydrolysis, extensive degradation occurs to produce phenol and other degradation products. It has commonly been known that the chlorophenols would be more difficult to hydrolyze because of the deactivating effect of the hydroxy group for this type of reaction. With the hydrolyzing agents of this invention, such as sodium acetate or sodium propionate, however, the hydrolysis can be accomplished readily and in good yield under the conditions outlined earlier.

The scope of the invention is particularly pointed out in the appended claims.

What is claimed is:

1. A process for hydrolyzing a halogenated aromatic compound corresponding to the formula

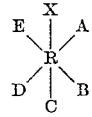

wherein R is a benzene, naphthalene or anthracene nucleus, X is a halogen and A, B, C, D and E are the same or different members selected from the class consisting of hydrogen, halogens, alkyl groups of 1 to 3 carbon atoms, hydroxyl, carboxyl, alkoxy groups of 1 to 3 carbon atoms, phenyl and phenoxy groups which process comprises:
  introducing said compound, together with water, a hydrolyzing agent composed of a salt of an organic acid and a base, and a catalyst selected from the group consisting of copper metal, copper oxide and copper salts into a reaction zone,
  adjusting the acidity of the resulting mixture to a pH within the range between about 3 and 6,
  and maintaining the resulting mixture at a pH between about 3 and 6, at a temperature between about 200° and 350° C. and at a pressure sufficient to maintain the reactants essentially in liquid phase for a period sufficient to effect substantial hydrolysis of said halogenated aromatic compound.

2. The process of claim 1 wherein the organic acid is a low molecular weight alkanoic acid.

3. The process of claim 1 wherein the organic acid is a low molecular weight alkanoic acid and the cation of base is selected from the group consisting of the alkali metals and alkaline earth metals.

4. The process of claim 1 wherein the hydrolyzing agent is an alkali metal acetate.

5. The process of claim 1 wherein the hydrolyzing agent is sodium propionate.

6. The process of claim 1 wherein the catalyst is cuprous oxide.

7. The process of claim 1 wherein the halogenated compound is a chlorinated compound.

8. The process of claim 1 wherein the halogenated compound is a brominated compound.

9. The process of claim 1 wherein the acidity of the reaction mixture is maintained at a pH in the range about 3 and about 6 throughout the courses of the process.

10. A process for making a hydroxyl substituted compound which comprises:
mixing (1) a halogenated aromatic compound selected from the group consisting of mono- and dichlorinated benzenes, toluene and xylenes, mono- and dibromobenzenes, mono- and diiodobenzenes, chlorophenol, chlorobenzoic acid, chlorophenetole and chloroanisole, (2) about 1.05 to 1.8 equivalents of an alkali metal salt of a lower alkanoic acid per atom of halogen of said halogenated compound to be hydrolyzed, (3) about 5 to 80 molar equivalents of water per each halogen to be replaced and (4) a catalyst selected from the group consisting of copper metal, copper oxide, and copper salts,
adjusting the acidity of the resulting mixture to a pH between about 3 and 6; and
maintaining the resulting mixture in liquid phase at a pH between about 3 and 6 at a temperature between between about 225° to 275° C. until the desired degree of hydrolysis is obtained.

11. The process of claim 10 wherein said halogenated aromatic compound is a chlorinated benzene hydrocarbon and said alkali metal salt is a sodium of an alkanoic acid having 2 to 3 carbon atoms per molecule.

12. The process of claim 10 wherein said halogenated aromatic compound is a chlorophenol.

References Cited

UNITED STATES PATENTS 2,906,774   9/1959   Raecke et al. _____ 260—525

OTHER REFERENCES

Ayres: "Quantitative Chemical Analysis," Harper, N.Y., 1958, pp. 56–59.

Rosemund et al.: Berichte, vol. 53 (1920), pp. 2226–40.

LORRAINE A. WEINBERGER, *Primary Examiner.*

D. E. STENZEL, *Assistant Examiner.*